United States Patent [19]

Tickle

[11] 3,833,760

[45] Sept. 3, 1974

[54] TELEVISION SYSTEMS

[75] Inventor: John Edward Tickle, Heald Green, England

[73] Assignee: Ferranti Limited, Hollinwood, England

[22] Filed: Feb. 27, 1973

[21] Appl. No.: 336,374

[52] U.S. Cl......... 178/6.8, 178/DIG. 6, 178/DIG. 35
[51] Int. Cl. .............................................. H04n 5/22
[58] Field of Search.......... 178/6.8, DIG. 6, DIG. 35

[56] References Cited

UNITED STATES PATENTS 3,637,997 1/1972 Petersen ........................ 178/DIG. 6
3,689,694 9/1972 Thorpe ................................ 178/6.8
3,757,041 9/1973 Thorpe .......................... 178/DIG. 6

*Primary Examiner*—Howard W. Britton
*Attorney, Agent, or Firm*—Cameron, Kerkam, Sutton, Stowell & Stowell

[57] ABSTRACT

A television system for producing overlay effects by replacing part of a background image by an overlay image includes a detector operable to detect the presence or absence of the overlay image during a predetermined scan line. The detector output is connected to control means operable to move the overlay image vertically to the desired position.

5 Claims, 3 Drawing Figures

TELEVISION SYSTEMS

This invention relates to television systems, and particularly to means for controlling the superimposition of images in such systems.

The superimposition of images in a television picture to achieve what is known as the "overlay" effect is achieved by combining two video signals representing two images in such a manner that the signal representing one of the images inhibits and replaces the signal representing the other image over that area of the picture frame occupied by the first image. Such an effect is relatively simple to produce, and many such systems are known. In these systems accurate registration is not usually required, since an error in position of, say, a few line widths on a 625-line picture will not usually be noticeable to the viewer.

There are sometimes instances where very accurate vertical registration is required. One such application arises in the field of training simulators for aircraft or ships, where the vertical position of an object relative to an electronically generated "horizon" may be very important. If, for example, a model of a ship viewed by a television camera is required to be exactly on the horizon, it is rather disturbing to see the "sky" appearing under the ship. Due to the tone contrast between the ship and the sky such an effect is immediately noticeable, even if the error in registration is only one or two lines wide, that is less than 0.05 percent. These vertical errors in registration may be due to both mechanical and electronic causes, and may vary during viewing. Similar errors occurring when part of the ship is located below the horizon are not noticeable.

It is an object of the present invention to provide a television system in which the above-mentioned problem of vertical registration of an overlaid image on a background image is avoided.

According to the present invention there is provided a television system for producing overlay effects by replacing part of a background image by an overlay image, which includes detector means operable to detect the presence or absence of the overlay image during a predetermined scan line of the television picture, and control means responsive to the output from the detector means to change the vertical position of the overlay image in the desired direction.

Figure 1:
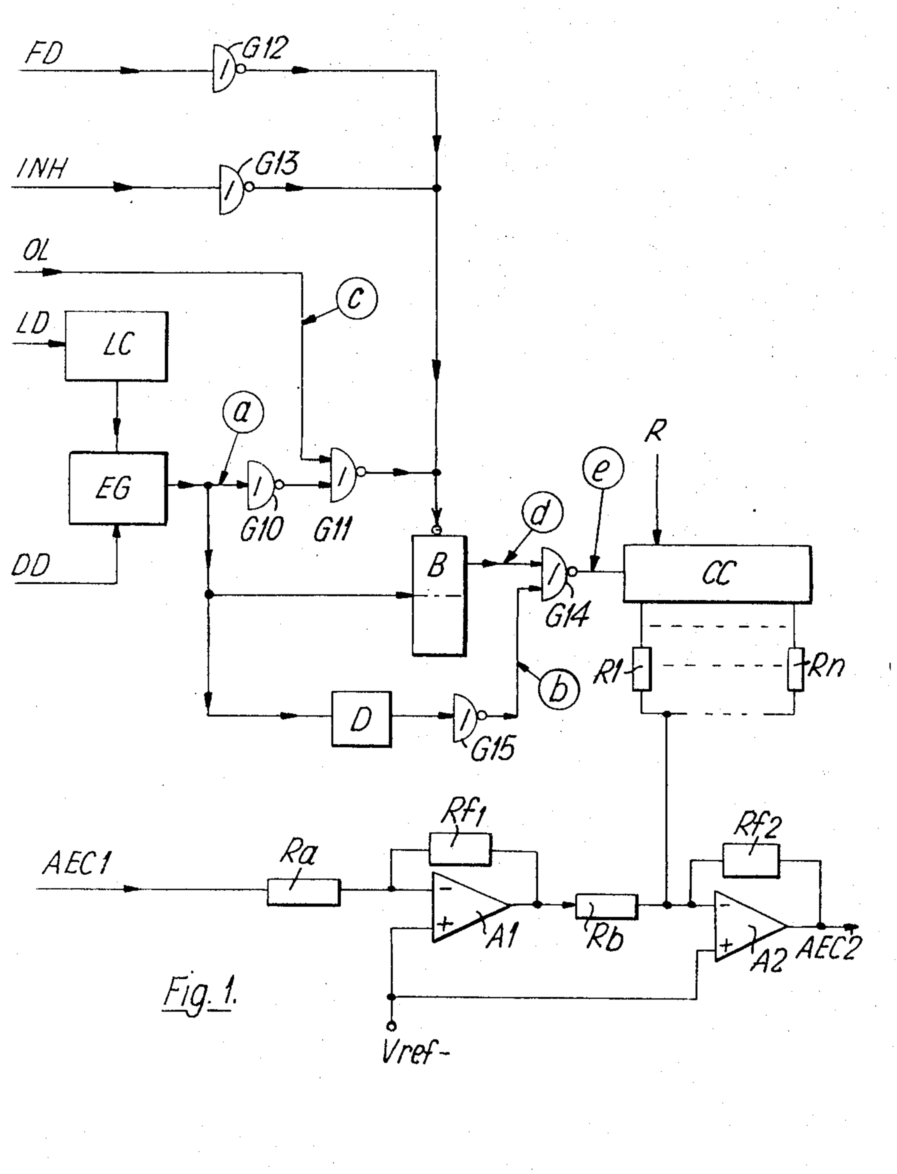
Figure 2:
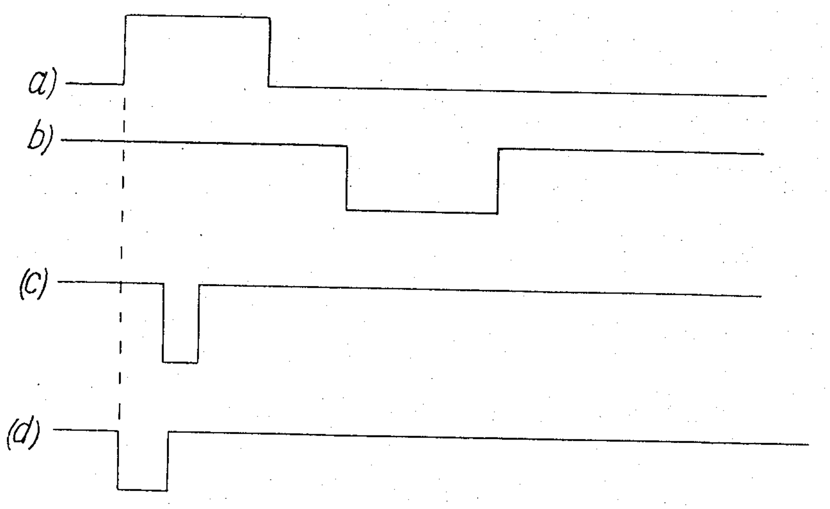
Figure 3:
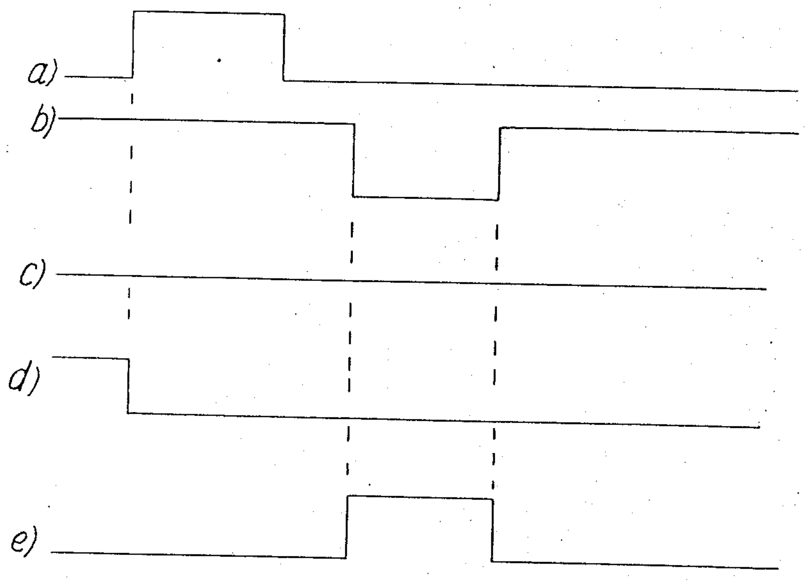

An embodiment of the invention will now be described with reference to the accompanying drawings, in which:

FIG. 1 is a block diagram of the detector and control means of such a television system; and FIGS. 2 and 3 show pulse waveforms occurring during the operation of the embodiment of FIG. 1.

The drawings refer to an embodiment in which the vertical correction applied to the overlayed image is in a downward direction only. Such an arrangement has application to the training simulator referred to above where, for example, small errors in registration which increase the "overlap" between a ship and the horizon are not noticeable, whereas the "flying ship" situation is immediately obvious.

Referring now to FIG. 1, an 8-bit line counter LC has as its input line drive pulses LD. The outputs of the line counter are applied to an equivalence gate EG where they are compared with a parallel digital input DD representing the demanded "horizon" position. The output of the equivalence gate EG is applied to the input of a NOR-gate G10 where it is inverted and passed to one input of a two-input NOR gate G11. The other input to gate G11 is a signal OL representing the presence or absence of the overlayed image. The output of gate G11 is connected to the "clear" input of a bistable circuit B. Also connected to the clear input of B is the output of a NOR-gate G12, to which are applied frame drive pulses FD, and the output of a further NOR-gate G13 to which are applied inhibit signals INH. The output of the equivalence gate EG is connected to the shift input of the bistable circuit B.

The output of the bistable circuit B is connected to one input of a two-input NOR-gate G14, whilst to the other input is connected the output of equivalence gate EG delayed by one line by delay unit D, and inverted by NOR-gate G15. Gates G10 to G15 and bistable circuit B form the detector means of the invention.

The output of gate G14 is used as the shift input of a non-synchronous binary counter hereafter referred to as the correction counter CC. One output from each stage is connected through a resistor R1 to R*n* respectively, the other ends of the resistors being connected together. A reset signal R may be applied to each stage of the counter as shown.

An analogue elevation control voltage AEC1 is used to control the vertical position of the overlayed image as accurately as possible, but is subject to the errors referred to above. Corrections may be applied to this by means of two operational amplifiers A1 and A2. The AEC1 signal is connected via a resistor R*a* to the inverting input of amplifier A1, the non-inverting input being connected to a reference voltage Vref. Amplifier A1 has a feedback resistor $Rf_1$. The output of amplifier A1 is connected via a resistor R*b* to the inverting input of the second amplifier A2, its non-inverting input also being connected to the reference voltage Vref. Amplifier A2 also has a feedback resistor $Rf_2$. The common connection to resistors R1 to R*n* is connected to the inverting input to amplifier A2. The output of amplifier A2 forms the correct analogue elevation control voltage AEC2, which is applied to the display circuitry. The correction counter CC and elevation control circuitry form the control means of the invention.

The operation of the apparatus described above will now be described with reference also to FIGS. 2 and 3. The logic is such that a logic '0' is the lower of two voltages.

The signal DD representing the demanded horizon position is applied to the equivalence gate EG in parallel digital form. The line counter LC is fed with line drive pulse LD and gives a similar parallel digital output, which is also applied to the equivalence gate EG. When the line count equals the demanded horizon position the output of the equivalence gate is a pulse changing from '0' to '1' for the duration of the selected line. This is shown at FIG. 2*a*).

This input is applied to gate G10 and also directly to the clock input of bistable B. Hence during the selected scan line a logic '1' is applied to the clock input of the bistable circuit B. The positive edge of this pulse causes a '0' to appear on the "upper" output as shown in FIG. 1, unless the output of any one of gates G11, G12 or G13 represents a logic '1.' In normal circumstances the outputs of gates G12 and G13 will be '0.' The presence of this '0' output from the bistable circuit B renders the output from gate G14 dependent upon the state of the other, delayed, input.

For the duration of the selected line pulse, the output of gate G10 will be '0'. This forms one input of gate G11. The other input to gate G11 is the OL signal representing the overlay image, and being in the form of an inverted and modified form of the video pulse representing that image.

If, during the selected scan line, the overlay image is present, then the OL signal will, at some time during the scan line, become '0' as shown at FIG. 2(*c*). This results in a '1' output from gate G11 which resets the bistable circuit B, terminating its output as shown in FIG. 2(*d*). The output of gate G14 is now inhibited, regardless of the state of its other input.

The selected line pulse is delayed by delay unit D and inverted by gate G15. Hence the output of G15 is a logic '1' except during the next scan line, when it becomes '0,' as shown in FIG. 2(*b*). During this pulse gate G14 is, however, inhibited by its other input, and no output is generated. Thus no input is applied to the correction counter, and no additional elevation control voltage is generated.

At the end of the frame scan a frame drive pulse FD is applied via gate G12 and hence is applied to the reset input of the bistable circuit B. However, since this has already been reset by the OL signal, the FD pulse has no effect.

If, during the selected scan line of the next frame there is no OL signal, then the bistable circuit B is not reset during the selected line pulse. Hence the '0' output from the bistable circuit B remains applied to the gate G14, making the output of this gate dependent upon the next pulse. During this latter pulse the other input to gate G14 changes to '0,' and hence the output from the gate changes to '1.'

This output is applied to the correction counter as a single shift pulse. The first stage of the counter produces an output causing a current to flow through the resistor R1. The voltage developed across this resistor is used to correct the position of the overlay image, as will be described below.

As before, the bistable circuit B is reset by the next frame drive pulse FD.

If, during the next frame scan, the overlay image is still not in the correct position, another shift pulse is applied to the correction counter. This may be repeated up to a maximum determined by the capacity of the correction counter CC.

If, on the other hand, the next frame scan finds the overlay image in the correct position, then no further correction is applied.

Under certain circumstances it may be necessary to inhibit the action of the apparatus. This may be done by applying a logic '0' to the input of gate G13. The output of this gate is thus a '1' which sets the bistable circuit B to a permanently clear condition, thus inhibiting any further correction counter shift pulses.

When the correction is no longer required a reset signal B resets the correcting counter to zero.

The vertical correction is applied to the analogue elevation control voltage AEC1 by means of the correction counter. Since, in the embodiment described, the correction only operates in the downward direction, the analogue voltage has to be inverted before any correcting voltage is added to it, and this is the function of operational amplifier A1 and its associated input resistor R*a* and feedback resistor R*f*1.

The setting of the correction counter causes voltage to be developed across one or more of resistors R1 to R*n*. These are chosen to have values with a binary relationship, such as R, 2R, 4R, 8R . . . . The appropriate voltages are added to one another and to the elevation control voltage. The new analogue elevation control voltage is then again inverted to its original sense by amplifier A2 to give the corrected analogue elevation control voltage AEC2.

In certain situations the position of the horizon may be fixed, in which case the line counter LC, equivalence gate EG and digital horizon position signal DD may be dispensed with. The input to gate G10 would now be the selected line pulse. The "next line" input to gate G14 may be obtained from this by means of the delay unit D and gate G15 as described, or may be derived directly from the line pulse immediately following that selected for the horizon.

If the system is required to provide upwards correction instead of or as well as the downwards correction described above, then the detector means will require modification. The shift voltage correction circuitry will also require modification since inversion of the voltage AEC1 is not required when the correction is upwards.

Alternatively it is possible to replace the analogue elevation control voltage. A binary counter may be used to count the lines between the required and actual position of the overlay image, and the output of this counter may be used to develop the required vertical shift voltage for the overlay image.

Other modifications may be made to the circuitry of FIG. 1 without departing from the basic feature of the invention.

What I claim is:

1. A television system for producing overlay effects by replacing part of a background image by an overlay image, which includes detector means operable to detect the presence or absence of the overlay image during a predetermined scan line of the television picture, and control means responsive to the output from the detector means to change the vertical position of the overlay image in the required direction.

2. A system as claimed in claim 1 in which the detector means includes a bistable device which is set to one of its two stable states at the beginning of the predetermined scan line and to the other of its two stable states by the presence of an overlay image during that scan line, and gating means responsive to the output of the bistable device to apply a signal to the gating means only when the overlay image is absent during said predetermined scan line.

3. A system as claimed in claim 1 in which the control means includes a correction counter to which the output of the detector means is applied and shift voltage control means responsive to the state of the correction counter to develop an appropriate shift voltage operable to vary the vertical position of the overlay image.

4. A system as claimed in claim 3 in which the shift voltage control means includes combining means for combining the shift voltage generated therein with any existing shift voltage applied to the overlay image.

5. A system as claimed in claim 3 in which the correction counter is operable to count the number of scan lines between the actual position of the overlay image and said predetermined scan line.

* * * * *

PO-1050
(5/69)

UNITED STATES PATENT OFFICE
CERTIFICATE OF CORRECTION

Patent No. 3,833,760 Dated September 3, 1974

Inventor(s) John Edward Tickle

It is certified that error appears in the above-identified patent and that said Letters Patent are hereby corrected as shown below:

Cover page, after item [21] insert
--[30] Foreign Application Priority Data
Feb. 29, 1972 Great Britain 9420/72--.

Signed and sealed this 5th day of November 1974.

;EAL)
:test:

:COY M. GIBSON JR.
:testing Officer

C. MARSHALL DANN
Commissioner of Patents